US012808071B2

(12) United States Patent
Xu et al.

(10) Patent No.: US 12,808,071 B2
(45) Date of Patent: Nov. 24, 2026

(54) POLARITY REVERSAL METHOD FOR ELECTRODE DEVICE BASED ON UNSTABLE POWER SUPPLY

(71) Applicant: NINGBO C.F ELECTRONIC TECH CO., LTD., Zhejiang (CN)

(72) Inventors: Yiwu Xu, Zhejiang (CN); Zefeng Chen, Zhejiang (CN); Peifeng Chen, Zhejiang (CN)

(73) Assignee: NINGBO C.F. ELECTRONIC TECH CO., LTD., Zhejiang (CN)

( * ) Notice: Subject to any disclaimer, the term of this patent is extended or adjusted under 35 U.S.C. 154(b) by 140 days.

(21) Appl. No.: 18/875,729

(22) PCT Filed: Jun. 26, 2023

(86) PCT No.: PCT/CN2023/102250
§ 371 (c)(1),
(2) Date: Dec. 17, 2024

(87) PCT Pub. No.: WO2024/016943
PCT Pub. Date: Jan. 25, 2024

(65) Prior Publication Data

US 2025/0167545 A1 May 22, 2025

(30) Foreign Application Priority Data

Jul. 21, 2022 (CN) ......................... 202210863831.6

(51) Int. Cl.
*C25B 15/02* (2021.01)
*C25B 9/65* (2021.01)
*H02J 7/35* (2006.01)

(52) U.S. Cl.
CPC ................ *C25B 15/02* (2013.01); *C25B 9/65* (2021.01); *H02J 7/35* (2013.01); *C02F 2201/4613* (2013.01); *H02J 2207/10* (2020.01)

(58) Field of Classification Search
CPC ... C02F 2201/4613; C25B 9/65; C25B 15/02; H02J 7/35
See application file for complete search history.

(56) References Cited

U.S. PATENT DOCUMENTS 4,769,119 A * 9/1988 Grundler ............... C02F 1/4606 205/744
5,013,417 A * 5/1991 Judd, Jr. ............... C02F 1/4606 204/229.5

(Continued)

FOREIGN PATENT DOCUMENTS

CN 101318725 12/2008
CN 102807268 12/2012

(Continued)

OTHER PUBLICATIONS

Translation of FR 2976573 A1. Dec. 12, 2012. (Year: 2012).*

(Continued)

*Primary Examiner* — Thienvu V Tran
*Assistant Examiner* — Christopher J Clark
(74) *Attorney, Agent, or Firm* — JCIPRNET

(57) ABSTRACT

A polarity reversal method for an electrode device based on an unstable power supply is provided. The electrode device includes electrodes, an unstable power supply, a polarity reversal module, and a control module, the unstable power supply supplies power to the electrode through the polarity reversal module, and the control module controls the polarity reversal module to implement polarity reversal on the electrodes. The polarity reversal method includes: at least in a stage in which a reverse voltage is eliminated for the electrodes when polarity reversal is performed on the electrode device based on the unstable power supply, limiting the amount of electric energy transmitted by the unstable power supply to the electrodes, or controlling a stable power supply to be connected to supply power to the electrodes, to (Continued)

ensure electric energy required for operation of the control module in the electrode device based on the unstable power supply.

10 Claims, 3 Drawing Sheets

(56) References Cited

U.S. PATENT DOCUMENTS

| | | | | |
|---|---|---|---|---|
| 11,027,991 | B2 * | 6/2021 | Cosentino | C02F 1/46104 |
| 2013/0342028 | A1 | 12/2013 | Hermann et al. | |
| 2020/0048780 | A1 * | 2/2020 | Pisciotta | C25B 1/04 |

FOREIGN PATENT DOCUMENTS

| | | | | |
|---|---|---|---|---|
| CN | 107425599 | | 12/2017 | |
| CN | 108314146 | | 7/2018 | |
| CN | 109450222 | | 3/2019 | |
| CN | 110002555 | | 7/2019 | |
| CN | 112358013 | | 2/2021 | |
| CN | 113321274 | | 8/2021 | |
| CN | 115161684 | | 10/2022 | |
| CN | 217642847 | | 10/2022 | |
| FR | 2976573 | A1 * | 12/2012 | C25B 15/023 |
| WO | 2022100301 | | 5/2022 | |

OTHER PUBLICATIONS

"International Search Report (Form PCT/ISA/210) of PCT/CN2023/102250", mailed on Sep. 27, 2023, with English translation thereof, pp. 1-6.

"Written Opinion of the International Searching Authority (Form PCT/ISA/237) of PCT/CN2023/102250", mailed on Sep. 27, 2023, pp. 1-5.

* cited by examiner

POLARITY REVERSAL METHOD FOR ELECTRODE DEVICE BASED ON UNSTABLE POWER SUPPLY

CROSS-REFERENCE TO RELATED APPLICATION

This application is a 371 of international application of PCT application serial no. PCT/CN2023/102250, filed on Jun. 26, 2023, which claims the priority benefit of China application no. 202210863831.6, filed on Jul. 21, 2022. The entirety of each of the above-mentioned patent applications is hereby incorporated by reference herein and made a part of this specification.

TECHNICAL FIELD

The present invention relates to the field of a method for controlling an electrode device, and in particular to a polarity reversal method for an electrode device based on an unstable power supply.

DESCRIPTION OF RELATED ART

Electrode devices are devices for implementing electrolysis, such as chlorinators. The chlorinators are widely used in swimming pools to improve the water quality in the swimming pools.

With the development of clean energy, solar-based electrode devices have emerged. However, electric energy obtained by solar panels is usually stored in batteries, and the batteries are then used to supply power to electrodes. Because the batteries are charged and discharged for limited times, disposing of the batteries reduces the service life of the solar-based electrode devices. However, when the batteries are removed and the solar panels are directly used to supply power to the electrodes, because electric power of the solar panels is extremely low on cloudy days, rainy days, in winter, in the morning and evening, on cloudy days, and the like with poor lighting conditions. In addition, when polarity reversal is performed on the electrode, a reverse voltage is left from previous electrolysis between a cathode plate and an anode plate. If the solar panel directly supplies energy to the electrode, a voltage of the solar panel drops rapidly, causing a control module to be restarted repeatedly due to a low voltage, and normal polarity reversal cannot be completed, directly affecting the working efficiency and electrode life.

SUMMARY

To overcome shortcomings in the prior art, the present invention provides a polarity reversal method for an electrode device based on an unstable power supply, so that enough power supply to the control module is ensured when polarity reversal is performed on the electrodes and electric energy of the unstable power supply is not enough, to prevent the control module from being constantly restarted.

To achieve the foregoing objectives, the following technical solutions are used in the present invention.

A polarity reversal method for an electrode device based on an unstable power supply, and the electrode device based on the unstable power supply includes electrodes, an unstable power supply, a polarity reversal module, and a control module, the unstable power supply supplies power to the electrode through the polarity reversal module, and the control module controls the polarity reversal module to implement polarity reversal on the electrodes, and the polarity reversal method includes:

at least in a stage in which a reverse voltage is eliminated for the electrodes when polarity reversal is performed on the electrode device based on the unstable power supply, limiting the amount of electric energy transmitted by the unstable power supply to the electrodes, or controlling a stable power supply to be connected to supply power to the electrodes, to ensure electric energy required for operation of the control module in the electrode device based on the unstable power supply.

Because a reverse voltage left last time exists on the electrode when polarity reversal is performed on the electrode, and the reverse voltage is opposite to a voltage of the unstable power supply, in a case that there is not enough electric energy of the unstable power supply due to a characteristic of the unstable power supply, the voltage of the unstable power supply drops until the control module cannot work, causing the control module to be repeatedly restarted. In the above method, it can be ensured that the control module works normally without being restarted.

Further, at least in a stage in which a reverse voltage is eliminated for the electrodes when polarity reversal is performed on the electrode device based on the unstable power supply, the amount of electric energy transmitted by the unstable power supply to the electrodes is limited, or the stable power supply is controlled to be connected to supply power to the electrodes, to ensure electric energy required for operation of the control module and the polarity reversal module in the electrode device based on the unstable power supply.

In the above method, when the electric energy of the unstable power supply is not enough, polarity reversal on the electrodes can still be implemented, which prolongs electrolysis time of the electrodes and prolongs the service life of the electrodes.

Further, the limiting the amount of electric energy transmitted by the unstable power supply to the electrodes includes limiting a value of a voltage and/or a value of a current transmitted by the unstable power supply to the electrodes.

Further, if the stage in which the reverse voltage is eliminated for the electrodes when polarity reversal is performed on the electrode device based on the unstable power supply is completed, or if polarity reversal on the electrode device based on the unstable power supply is completed, stopping limiting the amount of electric energy transmitted by the unstable power supply to the electrodes, or removing the stable power supply to stop power supply to the electrodes.

In the above result, if the stage in which the reverse voltage is eliminated for the electrodes when polarity reversal is performed on the electrode device based on the unstable power supply is completed, or if polarity reversal on the electrode device based on the unstable power supply is completed, the electrode can obtain maximum electric energy from the unstable power supply, improving the work efficiency; or the stable power supply is removed to stop working, prolonging the service life.

Specifically, when polarity reversal is started, if the amount of the electric energy transmitted by the unstable power supply to the electrodes is limited, when the stage in which the reverse voltage is eliminated is completed or polarity reversal on the electrode device based on the unstable power supply is completed, limiting the amount of the electric energy transmitted by the unstable power supply to the electrodes is stopped. If the stable power supply is controlled to be connected to supply power to the electrode, when the stage in which the reverse voltage is eliminated is completed or polarity reversal on the electrode device based on the unstable power supply is completed, the stable power supply is removed to stop power supply to the electrode.

Further, the polarity reversal module is an H-bridge circuit, and the control module controls states of a first bridge arm and a second bridge arm in the H-bridge circuit to implement polarity reversal on the electrodes;

when the first bridge arm is turned on from turned off and the second bridge arm is turned off from turned on, a first electrode of the electrodes is changed from a cathode to an anode; and a second electrode of the electrodes is changed from an anode to a cathode; and when the second bridge arm is turned on from turned off and the first bridge arm is turned off from turned on, the second electrode of the electrodes is changed from the cathode to the anode; and the first electrode of the electrodes is changed from the anode to the cathode.

In the above method, the first bridge arm cooperates with the second bridge arm to implement polarity reversal on the electrodes.

Further, the control module drives, through a first PWM signal, the first bridge arm to be turned on, and drives, through a second PWM signal, the second bridge arm to be turned on; the control module limits a value of a voltage transmitted by the unstable power supply to the electrodes by controlling a duty cycle of the first PWM signal and a duty cycle of the second PWM signal;

at least in the stage in which the reverse voltage is eliminated for the electrodes when polarity reversal is performed on the electrode device based on the unstable power supply, if the first PWM signal drives the first bridge arm to be turned on, the duty cycle of the first PWM signal is greater than 0% and less than 100%; and if the second PWM signal drives the second bridge arm to be turned on, the duty cycle of the second PWM signal is greater than 0% and less than 100%.

In the above method, the value of the voltage transmitted by the unstable power supply to the electrodes is reduced by controlling the duty cycle of the first PWM signal or the duty cycle of the second PWM, to ensure that the voltage of the unstable power supply can still maintain the operation of the control module.

In the stage in which the reverse voltage is eliminated for the electrode, if the first bridge arm is turned on, the first bridge arm first eliminates the reverse voltage on the electrode by using a small voltage, so that an equivalent resistance of the electrode gradually increases, preventing the voltage transmitted by the unstable power supply from dropping to a voltage that cannot maintain normal working of the control module. The same goes if the second bridge arm is turned on.

Further, if the stage in which the reverse voltage is eliminated for the electrodes when polarity reversal is performed on the electrode device based on the unstable power supply is completed, or if polarity reversal on the electrode device based on the unstable power supply is completed, in a case that the first PWM signal drives the first bridge arm to be turned on, the duty cycle of the first PWM signal is controlled to be 0% if the first bridge arm is turned on through a low level; or the duty cycle of the first PWM signal is controlled to be 100% if the first bridge arm is turned on through a high level, to stop limiting the value of the voltage transmitted by the unstable power supply to the electrodes; and in a case that the second PWM signal drives the second bridge arm to be turned on, the duty cycle of the second PWM signal is controlled to be 0% if the second bridge arm is turned on through a low level, or the duty cycle of the second PWM signal is controlled to be 100% if the second bridge arm is turned on through a high level, to stop limiting the value of the voltage transmitted by the unstable power supply to the electrodes.

Further, the first bridge arm includes a first controllable switch and a fourth controllable switch, and the second bridge arm includes a second controllable switch and a third controllable switch; two ends of the first controllable switch are respectively connected to the first electrode of the electrodes and a positive electrode of the unstable power supply, and a control end is connected to the control module; two ends of the second controllable switch are respectively connected to the first electrode of the electrodes and the ground, and a control end is connected to the control module; two ends of the third controllable switch are respectively connected to the second electrode of the electrodes and the positive electrode of the unstable power supply, and a control end is connected to the control module; two ends of the fourth controllable switch are respectively connected to the second electrode of the electrodes and the ground, and a control end is connected to the control module; and the control module drives and controls the first controllable switch and the fourth controllable switch through the first PWM signal, and the control module drives and controls the second controllable switch and the third controllable switch through the second PWM signal.

Specifically, the first controllable switch, the second controllable switch, the third controllable switch, and the fourth controllable switch are MOS tubes, and sources and drains in the first controllable switch, the second controllable switch, the third controllable switch, and the fourth controllable switch are formed as two ends of the switches, and gates thereof are formed as control ends. More specifically, the first controllable switch and the third controllable switch are PMOS tubes, and the second controllable switch and the fourth controllable switch are NMOS tubes.

Further, the electrode device based on the unstable power supply includes a current-limiting resistor and a current-limiting resistor control unit configured to control whether the current-limiting resistor is connected between the unstable power supply and the electrodes; and at least in the stage in which the reverse voltage is eliminated for the electrodes when polarity reversal is performed on the electrode device based on the unstable power supply, the current-limiting resistor control unit connects the current-limiting resistor between the unstable power supply and the electrodes to limit a value of a current transmitted by the unstable power supply to the electrodes; or if the stage in which the reverse voltage is eliminated for the electrodes when polarity reversal is performed on the electrode device based on the unstable power supply is completed, or if polarity reversal on the electrode device based on the unstable power supply is completed, the current-limiting resistor control unit removes the current-limiting resistor from a position between the unstable power supply and the electrodes, to stop limiting the value of the current transmitted by the unstable power supply to the electrodes.

In the above method, when the current-limiting resistor is connected between the unstable power supply and the electrodes, the value of the current transmitted to the electrode can be reduced, and small current charging is implemented for the electrode, to eliminate the reverse voltage on the electrode.

Specifically, the current-limiting resistor is disposed between the unstable power supply and the polarity reversal module.

Further, the current-limiting resistor control unit includes a fifth controllable switch, the current-limiting resistor is disposed between the unstable power supply and the electrodes, and two ends of the fifth controllable switch are respectively connected to two ends of the current-limiting resistor, and a control end is connected to the control module, and the control module controls the fifth controllable switch to be turned off, to connect the current-limiting resistor between the unstable power supply and the electrodes; or the control module controls the fifth switch to be turned on, to remove the current-limiting resistor from the position between the unstable power supply and the electrodes.

In the above method, when the fifth controllable switch is turned off, two ends of the current-limiting resistor are not shorted, so that the current-limiting resistor is connected between the unstable power supply and the electrodes. When the fifth controllable switch is turned on, the two ends of the current-limiting resistor are shorted by the fifth controllable switch, so that the current-limiting resistor is removed from the position between the unstable power supply and the electrodes.

Specifically, the fifth controllable switch is a MOS tube, a source and drain are formed as two ends of the switch, and a gate is formed as a control end. More specifically, the fifth controllable switch is an NMOS tube.

Further, the electrode device based on the unstable power supply includes the stable power supply and a stable power supply control unit configured to control whether the stable power supply is connected to supply power to the electrode;

at least in the stage in which the reverse voltage is eliminated for the electrodes when polarity reversal is performed on the electrode device based on the unstable power supply, the stable power supply control unit connects the stable power supply to supply power to the electrode; and if the stage in which the reverse voltage is eliminated for the electrodes when polarity reversal is performed on the electrode device based on the unstable power supply is completed, or if polarity reversal on the electrode device based on the unstable power supply is completed, the stable power supply control unit removes the stable power supply to stop power supply to the electrode.

In the above method, when the stable power supply is connected, the reverse voltage can be quickly eliminated, and the electrode can be charged when polarity reversal is performed on the electrode, to prevent the influence on the voltage of the unstable power supply, and therefore the control module can still work normally.

The stable power supply is removed, so that the service life of the stable power supply can be prolonged.

Specifically, the stable power supply supplies power to the electrode through the polarity reversal module.

Further, the stable power supply control unit includes a sixth controllable switch, a positive electrode of the stable power supply is connected to the electrode through the polarity reversal module, a negative electrode is grounded through a switch end of the sixth controllable switch, a control end of the sixth controllable switch is connected to the control module, and the control module controls the sixth controllable switch to be turned on, to connect the stable power supply to supply power to the electrode; and the control module controls the sixth switch to be turned off, to remove the stable power supply to stop power supply to the electrode.

In the above method, after the sixth controllable switch is turned on, a loop is formed between the stable power supply and the electrode, and the stable power supply supplies power to the electrode. After the sixth controllable switch is turned off, the stable power supply is disconnected from the electrode, and the stable power supply stops power supply to the electrode.

Specifically, the sixth controllable switch is a MOS tube, a source and drain are formed as two ends of the switch, and a gate is formed as a control end. More specifically, the sixth controllable switch is an NMOS tube.

Further, when polarity reversal is performed on the electrode device based on the unstable power supply, if voltages at two ends of the electrode are greater than a minimum working voltage value of the electrode, polarity reversal on the electrode device based on the unstable power supply is completed.

When polarity reversal is performed on the electrode device based on the unstable power supply, if polarity reversal time is greater than time for which the reverse voltage is eliminated for the electrodes, the stage in which the reverse voltage is eliminated for the electrodes when polarity reversal is performed on the electrode device based on the unstable power supply is completed.

Specifically, a minimum working voltage value of the electrode is 1.8V, and time for which the reverse voltage is eliminated for the electrodes is greater than 10 seconds.

Specifically, the control module is connected to the electrode to obtain a value of the voltage and a value of the current on the electrode. The electrode device based on the unstable power supply includes a measuring resistor connected in series in a loop in which the unstable power supply supplies power to the electrodes, so that the current on the electrode is measured and obtained.

Further, the polarity reversal method for the electrode device based on the unstable power supply includes ensuring that the voltage of the unstable power supply is greater than the minimum working voltage of the control module when polarity reversal is performed on the electrode.

Specifically, the control module is a single-chip microcomputer, and the minimum working voltage of the control module is 0.5V.

Further, the electrode device based on the unstable power supply is a chlorinator.

Further, the unstable power supply is a solar panel, and the stable power supply is a battery.

Further, the control module is connected to the unstable power supply to obtain a value of a voltage of the unstable power supply. Before polarity reversal is performed on the electrode device based on the unstable power supply, if the value of the voltage of the unstable power supply is greater than a preset value for polarity reversal, during polarity reversal, polarity reversal is directly completed without limiting the amount of electric energy transmitted by the unstable power supply to the electrodes and controlling the stable power supply to be connected to supply power to the electrodes; or if the value of the voltage of the unstable power supply is less than a preset value for polarity reversal, during polarity reversal, the amount of electric energy transmitted by the unstable power supply to the electrodes is limited, or the stable power supply is controlled to be connected to supply power to the electrodes, so that polarity reversal is completed.

In the above method, it is controlled, by using the value of the voltage of the unstable power supply, whether it is necessary to limit the amount of electric energy transmitted by the unstable power supply to the electrodes, or not to control the stable power supply to be connected to supply power to the electrodes, so that polarity reversal can be quickly completed in a case that the unstable power supply has enough power, the stable power supply and the polarity reversal module can be protected, and the service life can be prolonged.

Further, the electrode device based on the unstable power supply includes a test resistor and a test resistor control unit configured to control whether the unstable power supply supplies power to the test resistor; and before polarity reversal is performed on the electrode device based on the unstable power supply, the test resistor control unit controls the unstable power supply to supply power to the test resistor, to obtain a true value of the voltage of the unstable power supply.

Due to a characteristic of the unstable power supply, in a case that virtual electricity exists when there is not enough power, the control module cannot directly obtain the true voltage of the unstable power supply. In the above method, the test resistor is connected, and the unstable power supply supplies power to the test resistor. In this case, the control module can obtain the true value of the voltage of the unstable voltage.

Specifically, a resistance value of the test resistor is equal to or approximate to an equivalent resistance value of the electrode.

After the true value of the voltage of the unstable power supply is obtained before polarity reversal is performed on the electrode device based on the unstable power supply, the test resistor control unit controls the unstable power supply to stop power supply to the test resistor.

Further, the test resistor control unit includes a seventh controllable switch, one end of the test resistor is connected to a positive electrode of the unstable power supply, the other end is grounded through a switch end of the seventh controllable switch, and a control end of the seventh controllable switch is connected to the control module.

The control module controls the seventh controllable switch to be turned on, so that the unstable power supply supplies power to the test resistor. The control module controls the seventh switch to be turned off, so that the unstable power supply stops power supply to the test resistor.

Specifically, the seventh controllable switch is a MOS tube, a source and drain are formed as two ends of the switch, and a gate is formed as a control end. More specifically, the seventh controllable switch is an NMOS tube.

Compared with the conventional technologies, the present invention has the following beneficial effects. In the polarity reversal method for an electrode device based on an unstable power supply in the present invention, enough power supply to the control module is ensured when polarity reversal is performed on the electrodes and electric energy of the unstable power supply is not enough, to prevent the control module from being constantly restarted.

DESCRIPTION OF THE EMBODIMENTS

Specific implementations of the present invention are further described in detail with reference to accompanying drawings and embodiments. The following embodiments are used to describe the present invention, but are not used to limit the scope of the present invention.

Figure 1:
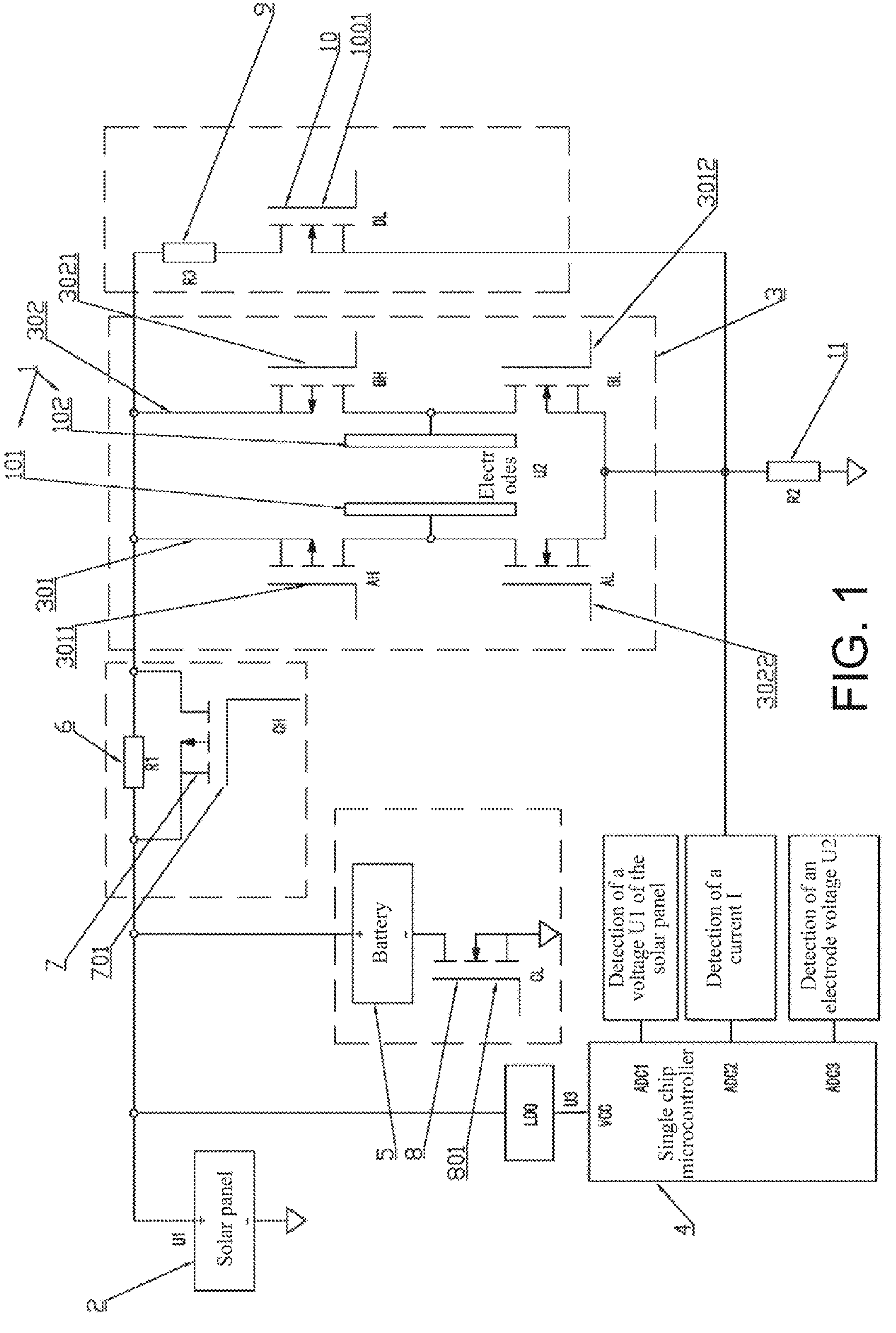
FIG. 1 is a schematic structural diagram of a circuit of an electrode device based on an unstable power supply according to the present invention.
Figure 2:
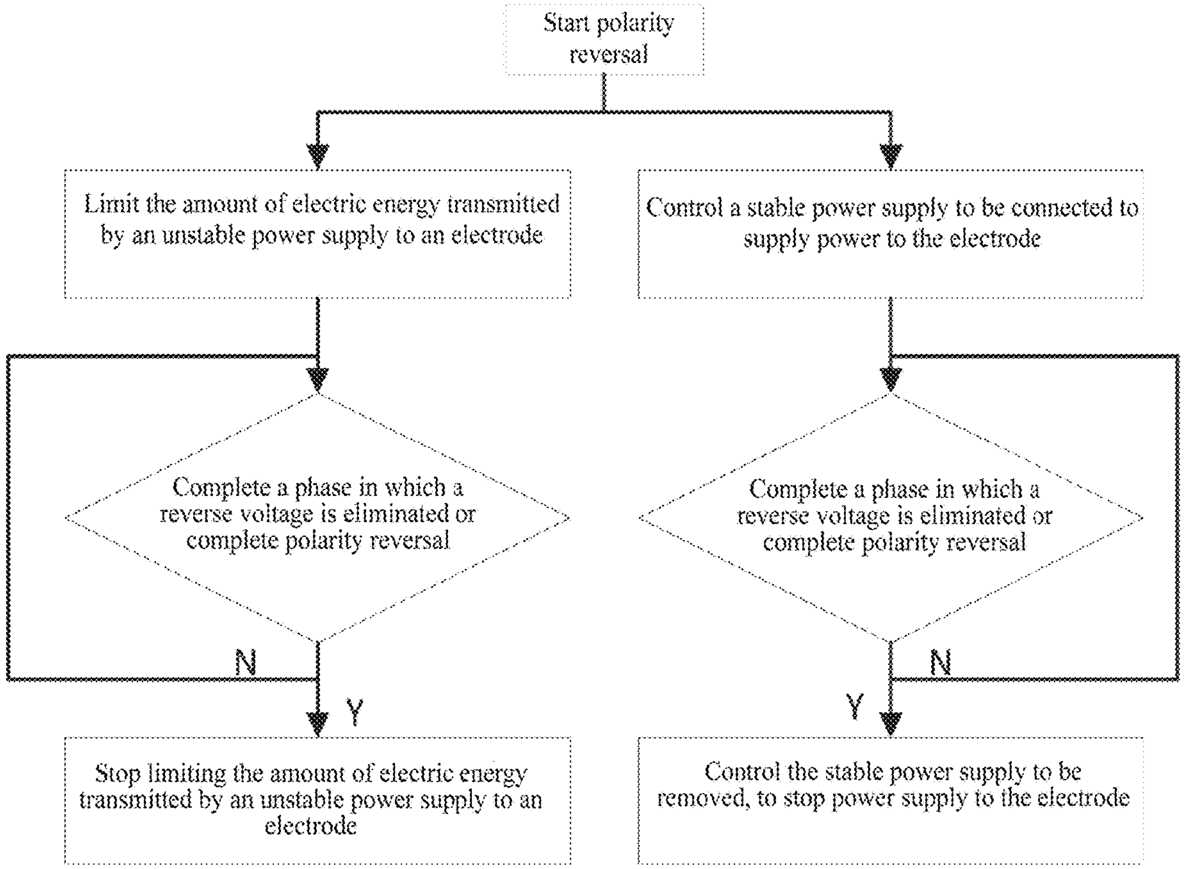
FIG. 2 is a schematic flow chart of a polarity reversal method for the electrode device based on an unstable power supply according to the present invention.

FIG. 1 and FIG. 2 show a polarity reversal method for an electrode device based on an unstable power supply. The electrode device based on an unstable power supply includes electrodes 1, an unstable power supply 2, a polarity reversal module 3, and a control module 4. The unstable power supply 2 supplies power to the electrodes 1 through the polarity reversal module 3, and the control module 4 controls the polarity reversal module 3 to implement polarity reversal on the electrodes 1. The polarity reversal method includes:

at least in a stage in which a reverse voltage is eliminated for the electrodes 1 when polarity reversal is performed on the electrode device based on the unstable power supply, limiting the amount of electric energy transmitted by the unstable power supply 2 to the electrodes 1, or controlling a stable power supply 5 to be connected to supply power to the electrodes 1, to ensure electric energy required for operation of the control module 4 in the electrode device based on the unstable power supply.

Because a reverse voltage left last time exists on the electrodes 1 when polarity reversal is performed on the electrodes 1, and the reverse voltage is opposite to a voltage of the unstable power supply 2, in a case that there is not enough electric energy of the unstable power supply 2, the voltage of the unstable power supply 2 drops due to a characteristic of the unstable power supply 2 until the control module 4 cannot work, causing the control module 4 to be repeatedly restarted. In the above method, it can be ensured that the control module 4 works normally without being restarted.

Further, at least in the stage in which a reverse voltage is eliminated for the electrodes 1 when polarity reversal is performed on the electrode device based on the unstable power supply, the amount of electric energy transmitted by the unstable power supply 2 to the electrodes 1 is limited, or the stable power supply 5 is controlled to be connected to supply power to the electrodes 1, to ensure electric energy required for operation of the control module 4 and the polarity reversal module 3 in the electrode device based on the unstable power supply.

In the above method, when the electric energy of the unstable power supply 2 is not enough, polarity reversal on the electrodes 1 can still be implemented, which prolongs electrolysis time of the electrodes 1 and prolongs the service life of the electrodes 1.

Further, the limiting the amount of electric energy transmitted by the unstable power supply 2 to the electrodes 1 includes limiting a value of a voltage and/or a value of a current transmitted by the unstable power supply 2 to the electrodes 1.

Further, if the stage in which the reverse voltage is eliminated for the electrodes 1 when polarity reversal is performed on the electrode device based on the unstable power supply is completed, or if polarity reversal on the electrode device based on the unstable power supply is completed, limiting the amount of electric energy transmitted by the unstable power supply 2 to the electrodes 1 is stopped, or the stable power supply 5 is removed to stop power supply to the electrodes 1.

In the above result, if the stage in which the reverse voltage is eliminated for the electrodes 1 when polarity reversal is performed on the electrode device based on the unstable power supply is completed, or if polarity reversal on the electrode device based on the unstable power supply is completed, the electrodes 1 can obtain maximum electric energy from the unstable power supply 2, improving the work efficiency; or the stable power supply 5 is removed to stop working, prolonging the service life.

Specifically, when polarity reversal is started, if the amount of the electric energy transmitted by the unstable power supply 2 to the electrodes 1 is limited, when the stage in which the reverse voltage is eliminated is completed or polarity reversal on the electrode device based on the unstable power supply is completed, limiting the amount of the electric energy transmitted by the unstable power supply 2 to the electrodes 1 is stopped. If the stable power supply 5 is controlled to be connected to supply power to the electrodes 1, when the stage in which the reverse voltage is eliminated is completed or polarity reversal on the electrode device based on the unstable power supply is completed, the stable power supply 5 is removed to stop power supply to the electrodes 1.

As shown in FIG. 1, further, the polarity reversal module 3 is an H-bridge circuit, and the control module 4 controls states of a first bridge arm 301 and a second bridge arm 302 in the H-bridge circuit to implement polarity reversal on the electrodes 1.

When the first bridge arm 301 is turned on from turned off and the second bridge arm 302 is turned off from turned on, a first electrode 101 of the electrodes 1 is changed from a cathode to an anode; and a second electrode 102 of the electrodes 1 is changed from an anode to a cathode.

When the second bridge arm 302 is turned on from turned off and the first bridge arm 301 is turned off from turned on, the second electrode 102 of the electrodes 1 is changed from the cathode to the anode; and the first electrode 101 of the electrodes 1 is changed from the anode to the cathode.

In the above method, the first bridge arm 301 cooperates with the second bridge arm 302 to implement polarity reversal on the electrodes 1.

Further, the control module 4 drives, through a first PWM signal, the first bridge arm 301 to be turned on, and drives, through a second PWM signal, the second bridge arm 302 to be turned on. The control module 4 limits a value of a voltage transmitted by the unstable power supply 2 to the electrodes 1 by controlling a duty cycle of the first PWM signal and a duty cycle of the second PWM signal.

At least in the stage in which the reverse voltage is eliminated for the electrodes 1 when polarity reversal is performed on the electrode device based on the unstable power supply, if the first PWM signal drives the first bridge arm 301 to be turned on, the duty cycle of the first PWM signal is greater than 0% and less than 100%; and if the second PWM signal drives the second bridge arm 302 to be turned on, the duty cycle of the second PWM signal is greater than 0% and less than 100%.

In the above method, the value of voltage transmitted by the unstable power supply 2 to the electrodes 1 is reduced by controlling the duty cycle of the first PWM signal or the duty cycle of the second PWM, to ensure that the voltage of the unstable power supply 2 can still maintain the operation of the control module 4.

In the stage in which the reverse voltage is eliminated for the electrodes 1, if the first bridge arm 301 is turned on, the first bridge arm 301 first eliminates the reverse voltage on the electrodes 1 by using a small voltage, so that an equivalent resistance of the electrodes 1 gradually increases, preventing the voltage transmitted by the unstable power supply 2 from dropping to a voltage that cannot maintain normal working of the control module 4. The same goes if the second bridge arm 302 is turned on.

Further, if the stage in which the reverse voltage is eliminated for the electrodes 1 when polarity reversal is performed on the electrode device based on the unstable power supply is completed, or if polarity reversal on the electrode device based on the unstable power supply is completed, in a case that the first PWM signal drives the first bridge arm 301 to be turned on, the duty cycle of the first PWM signal is controlled to be 0% if the first bridge arm 301 is turned on through a low level; or the duty cycle of the first PWM signal is controlled to be 100% if the first bridge arm 301 is turned on through a high level, to stop limiting the value of the voltage transmitted by the unstable power supply 2 to the electrodes 1; in a case that the second PWM signal drives the second bridge arm 302 to be turned on, the duty cycle of the second PWM signal is controlled to be 0% if the second bridge arm 302 is turned on through a low level, or the duty cycle of the second PWM signal is controlled to be 100% if the second bridge arm 302 is turned on through a high level, to stop limiting the value of the voltage transmitted by the unstable power supply 2 to the electrodes 1.

Further, the first bridge arm 301 includes a first controllable switch 3011 and a fourth controllable switch 3012, and the second bridge arm 302 includes a second controllable switch 3021 and a third controllable switch 3022. Two ends of the first controllable switch 3011 are respectively connected to the first electrode 101 of the electrodes 1 and a positive electrode of the unstable power supply 2, and a control end is connected to the control module 4. Two ends of the second controllable switch 3021 are respectively connected to the first electrode 101 of the electrodes 1 and the ground, and a control end is connected to the control module 4. Two ends of the third controllable switch 3022 are respectively connected to a second electrode 102 of the electrodes 1 and the positive electrode of the unstable power supply 2, and a control end is connected to the control module 4. Two ends of the fourth controllable switch 3012 are respectively connected to the second electrode 102 of the electrodes 1 and the ground, and a control end is connected to the control module 4.

The control module 4 drives and controls the first controllable switch 3011 and the fourth controllable switch 3012 through the first PWM signal, and the control module 4 drives and controls the second controllable switch 3021 and the third controllable switch 3022 through the second PWM signal.

Specifically, the first controllable switch 3011, the second controllable switch 3021, the third controllable switch 3022, and the fourth controllable switch 3012 are MOS tubes, and sources and drains in the first controllable switch 3011, the second controllable switch 3021, the third controllable switch 3022, and the fourth controllable switch 3012 are formed as two ends of the switches, and gates thereof are formed as control ends. More specifically, the first controllable switch 3011 and the third controllable switch 3022 are PMOS tubes, and the second controllable switch 3021 and the fourth controllable switch 3012 are NMOS tubes.

As shown in FIG. 1, further, the electrode device based on the unstable power supply includes a current-limiting resistor 6 and a current-limiting resistor control unit 7 configured to control whether the current-limiting resistor 6 is connected between the unstable power supply 2 and the electrodes 1.

At least in the stage in which the reverse voltage is eliminated for the electrodes 1 when polarity reversal is performed on the electrode device based on the unstable power supply, the current-limiting resistor control unit 7 connects the current-limiting resistor 6 between the unstable power supply 2 and the electrodes 1 to limit a value of a current transmitted by the unstable power supply 2 to the electrodes 1.

If the stage in which the reverse voltage is eliminated for the electrodes 1 when polarity reversal is performed on the electrode device based on the unstable power supply is completed, or if polarity reversal on the electrode device based on the unstable power supply is completed, the current-limiting resistor control unit 7 removes the current-limiting resistor 6 from a position between the unstable power supply 2 and the electrodes 1, to stop limiting the value of the current transmitted by the unstable power supply 2 to the electrodes 1.

In the above method, when the current-limiting resistor 6 is connected between the unstable power supply 2 and the electrodes 1, the value of the current transmitted to the electrodes 1 can be reduced, and small current charging is implemented for the electrodes 1, to eliminate the reverse voltage on the electrodes 1.

Specifically, the current-limiting resistor 6 is disposed between the unstable power supply 2 and the polarity reversal module 3.

Further, the current-limiting resistor control unit 7 includes a fifth controllable switch 701, the current-limiting resistor 6 is disposed between the unstable power supply 2 and the electrodes 1, and two ends of the fifth controllable switch 701 are respectively connected to two ends of the current-limiting resistor 6, and a control end is connected to the control module 4.

The control module 4 controls the fifth controllable switch 701 to be turned off, to connect the current-limiting resistor 6 between the unstable power supply 2 and the electrodes 1. The control module 4 controls the fifth switch to be turned on, to remove the current-limiting resistor 6 from the position between the unstable power supply 2 and the electrodes 1.

In the above method, when the fifth controllable switch 701 is turned off, two ends of the current-limiting resistor 6 are not shorted, so that the current-limiting resistor 6 is connected between the unstable power supply 2 and the electrodes 1. When the fifth controllable switch 701 is turned on, the two ends of the current-limiting resistor 6 are shorted by the fifth controllable switch 701, so that the current-limiting resistor 6 is removed from the position between the unstable power supply 2 and the electrodes 1.

Specifically, the fifth controllable switch 701 is a MOS tube, a source and drain are formed as two ends of the switch, and a gate is formed as a control end. More specifically, the fifth controllable switch 701 is an NMOS tube.

As shown in FIG. 1, further, the electrode device based on the unstable power supply includes the stable power supply 5 and a stable power supply control unit 8 configured to control whether the stable power supply 5 is connected to supply power to the electrodes 1.

At least in the stage in which the reverse voltage is eliminated for the electrodes 1 when polarity reversal is performed on the electrode device based on the unstable power supply, the stable power supply control unit 8 connects the stable power supply 5 to supply power to the electrodes 1.

If the stage in which the reverse voltage is eliminated for the electrodes 1 when polarity reversal is performed on the electrode device based on the unstable power supply is completed, or if polarity reversal on the electrode device based on the unstable power supply is completed, the stable power supply control unit 8 removes the stable power supply 5 to stop power supply to the electrodes 1.

In the above method, when the stable power supply 5 is connected, the reverse voltage can be quickly eliminated, and the electrodes 1 can be charged when polarity reversal is performed on the electrodes 1, to prevent the influence on the voltage of the unstable power supply 2, and therefore the control module 4 can still work normally.

The stable power supply 5 is removed, so that the service life of the stable power supply 5 can be prolonged.

Specifically, the stable power supply 5 supplies power to the electrodes 1 through the polarity reversal module 3.

Further, the stable power supply control unit 8 includes a sixth controllable switch 801, a positive electrode of the stable power supply 5 is connected to the electrodes 1 through the polarity reversal module 3, a negative electrode is grounded through a switch end of the sixth controllable switch 801, and a control end of the sixth controllable switch 801 is connected to the control module 4.

The control module 4 controls the sixth controllable switch 801 to be turned on, to connect the stable power supply 5 to supply power to the electrodes 1. The control module 4 controls the sixth switch to be turned off, to remove the stable power supply 5 to stop power supply to the electrodes 1.

In the above method, after the sixth controllable switch 801 is turned on, a loop is formed between the stable power supply 5 and the electrodes 1, and the stable power supply 5 supplies power to the electrodes 1. After the sixth controllable switch 801 is turned off, the stable power supply 5 is disconnected from the electrodes 1, and the stable power supply 5 stops power supply to the electrodes 1.

Specifically, the sixth controllable switch 801 is a MOS tube, a source and drain are formed as two ends of the switch, and a gate is formed as a control end. More specifically, the sixth controllable switch 801 is an NMOS tube.

Further, when polarity reversal is performed on the electrode device based on the unstable power supply, if voltages at two ends of the electrodes 1 are greater than a minimum working voltage value of the electrode, polarity reversal on the electrode device based on the unstable power supply is completed.

When polarity reversal is performed on the electrode device based on the unstable power supply, if polarity reversal time is greater than time for which the reverse voltage is eliminated for the electrodes 1, the stage in which the reverse voltage is eliminated for the electrodes 1 when polarity reversal is performed on the electrode device based on the unstable power supply is completed.

Specifically, a minimum working voltage value of the electrodes 1 is 1.8V, and time for which the reverse voltage is eliminated for the electrodes 1 is greater than 10 seconds.

Specifically, the control module 4 is connected to the electrodes 1 to obtain a value of the voltage and a value of the current on the electrodes 1. The electrode device based on the unstable power supply includes a measuring resistor 11 connected in series in a loop in which the unstable power supply 2 supplies power to the electrodes 1, so that the current on the electrodes 1 is measured and obtained.

Further, the polarity reversal method for the electrode device based on the unstable power supply includes ensuring that the voltage of the unstable power supply 2 is greater than the minimum working voltage of the control module 4 when polarity reversal is performed on the electrodes 1.

Specifically, the control module 4 is a single-chip microcomputer, and the minimum working voltage of the control module 4 is 0.5V.

Further, the electrode device based on the unstable power supply is a chlorinator.

Further, the unstable power supply 2 is a solar panel, and the stable power supply 5 is a battery.

Figure 3:
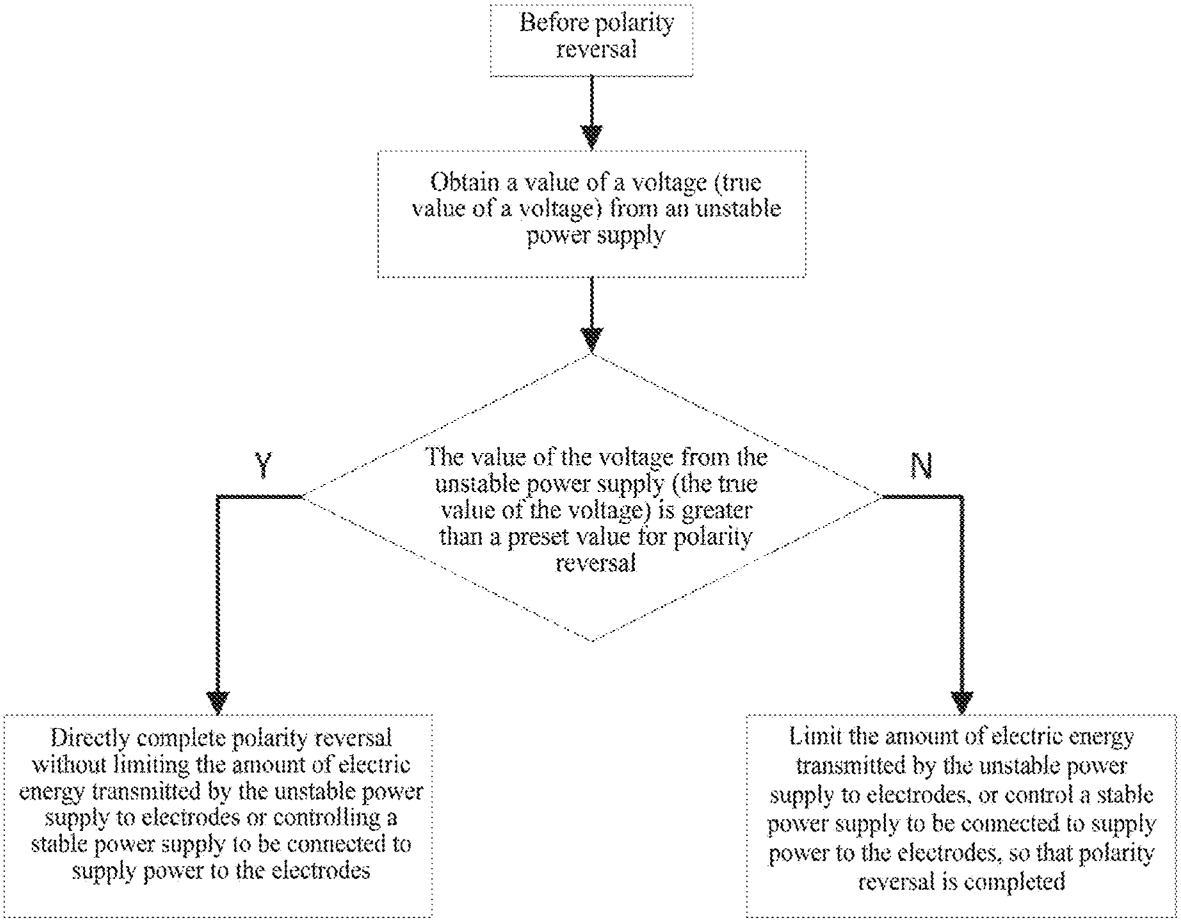
FIG. 3 is a schematic flow chart of a polarity reversal method for the electrode device based on an unstable power supply according to another embodiment of the present invention.

As shown in FIG. 1 and FIG. 3, further, the control module 4 is connected to the unstable power supply 2 to obtain a value of the voltage of the unstable power supply. Before polarity reversal is performed on the electrode device based on the unstable power supply, if the value of the voltage of the unstable power supply 2 is greater than a preset value for polarity reversal, during polarity reversal, polarity reversal is directly completed without limiting the amount of electric energy transmitted by the unstable power supply 2 to the electrodes 1 and controlling the stable power supply 5 to be connected to supply power to the electrodes 1. If the value of the voltage of the unstable power supply 2 is less than a preset value for polarity reversal, during polarity reversal, electric energy transmitted by the unstable power supply 2 to the electrodes 1 is limited, or the stable power supply 5 is controlled to be connected to supply power to the electrodes 1, so that polarity reversal is completed.

In the above method, based on the value of the voltage of the unstable power supply 2, it is controlled whether it is necessary to limit the amount of electric energy transmitted by the unstable power supply 2 to the electrodes 1 or not to control the stable power supply 5 to be connected to supply power to the electrodes 1, so that polarity reversal can be quickly completed in a case that the unstable power supply 2 has enough power, the stable power supply 5 and the polarity reversal module 3 can be protected, and the service life can be prolonged.

Further, the electrode device based on the unstable power supply includes a test resistor 9 and a test resistor control unit 10 configured to control whether the unstable power supply 2 supplies power to the test resistor 9.

Before polarity reversal is performed on the electrode device based on the unstable power supply, the test resistor control unit 10 controls the unstable power supply 2 to supply power to the test resistor 9, to obtain a true value of the voltage of the unstable power supply 2.

Due to a characteristic of the unstable power supply 2, in a case that virtual electricity exists when there is not enough power, the control module 4 cannot directly obtain the true voltage of the unstable power supply 2. In the above method, the test resistor 9 is connected, and the unstable power supply 2 supplies power to the test resistor 9. In this case, the control module 4 can obtain the true value of the voltage of the unstable voltage.

Specifically, a resistance value of the test resistor 9 is equal to or approximate to an equivalent resistance value of the electrodes 1.

After the true value of the voltage of the unstable power supply is obtained before polarity reversal is performed on the electrode device based on the unstable power supply, the test resistor control unit 10 controls the unstable power supply 2 to stop power supply to the test resistor 9.

Further, the test resistor control unit 10 includes a seventh controllable switch 1001, one end of the test resistor 9 is connected to a positive electrode of the unstable power supply 2, the other end is grounded through a switch end of the seventh controllable switch 1001, and a control end of the seventh controllable switch 1001 is connected to the control module 4.

The control module 4 controls the seventh controllable switch 1001 to be turned on, so that the unstable power supply 2 supplies power to the test resistor 9. The control module 4 controls the seventh switch to be turned off, so that the unstable power supply 2 stops power supply to the test resistor 9.

Specifically, the seventh controllable switch 1001 is a MOS tube, a source and drain are formed as two ends of the switch, and a gate is formed as a control end. More specifically, the seventh controllable switch 1001 is an NMOS tube.

A solar chlorinator is used as an example as follows. Data is measured under test conditions of water temperature of 26 degrees, salt concentration of 3,000 ppm, 20 grams of electrode (single), and a solar panel of 18V/50 W.

Data Comparison on Rainy Days

| Control | Solar voltage (V) | Electrode voltage (V) | Electrode current (mA) | Single chip voltage (V) | Whether polarity reversal is completed |
|---|---|---|---|---|---|
| PWM | 3.6 | 3.6 | 46 | 3.55 V | Yes |
| Current-limiting resistor | 3.5 | 3.55 | 45 | 3.53 V | Yes |
| Battery | 3.6 | 3.6 | 46 | 3.55 V | Yes |
| Direct | Change in a range of 1-18 V | Detection failure | Detection failure | Reset of the single chip microcontroller | No |

Data Comparison on Overcast Days

| Control | Solar voltage (V) | Electrode voltage (V) | Electrode current (mA) | Single chip voltage (V) | Whether polarity reversal is completed |
|---|---|---|---|---|---|
| PWM | 11.5 | 11.4 | 295 | 5.04 V | Yes |
| Current-limiting resistor | 11.5 | 11.3 | 292 | 5.04 V | Yes |
| Battery | 11.4 | 11.3 | 290 | 5.04 V | Yes |
| Direct | Change in a range of 1-18 V | Detection failure | Detection failure | Reset of the single chip microcontroller | No |

Comparison of Another Group of Data on Overcast Days

| Control | Solar voltage (V) | Electrode voltage (V) | Electrode current (mA) | Single chip voltage (V) | Whether polarity reversal is completed |
|---|---|---|---|---|---|
| PWM | 14.2 | 13.9 | 500 | 5.04 V | Yes |
| Current-limiting resistor | 14.1 | 13.9 | 500 | 5.04 V | Yes |
| Battery | 14.1 | 13.9 | 500 | 5.04 V | Yes |
| Direct | Change in a range of 0-18 V | Detection failure | Detection failure | Reset of the single chip microcontroller | No |

Data Comparison on Cloudy Days

| Control | Solar voltage (V) | Electrode voltage (V) | Electrode current (mA) | Single chip voltage (V) | Whether polarity reversal is completed |
|---|---|---|---|---|---|
| PWM | 15.8 | 15.4 | 720 | 5.04 V | Yes |
| Current-limiting resistor | 15.7 | 15.3 | 715 | 5.04 V | Yes |
| Battery | 15.9 | 15.4 | 722 | 5.04 V | Yes |
| Direct | 15.9 | 15.4 | 722 | Resetting the single chip microcontroller for 20 times | Polarity reversal is completed after 20 times |

Data Comparison on Sunny Days

| Control | Solar voltage (V) | Electrode voltage (V) | Electrode current (mA) | Single chip voltage (V) | Whether polarity reversal is completed |
|---|---|---|---|---|---|
| PWM | 18.9 | 18.0 | 2240 | 5.04 V | Yes |
| Current-limiting resistor | 18.5 | 17.9 | 2230 | 5.04 V | Yes |
| Battery | 18.4 | 17.9 | 2230 | 5.04 V | Yes |
| Direct | 18.4 | 17.9 | 2230 | 5.04 V | Yes |

In a control column in the table, the "PWM" means that the solar chlorinator uses, during polarity reversal, the first PWM signal to drive the first bridge arm and the second PWM signal to drive the second bridge arm, to limit a value of the voltage transmitted by the solar panel to the electrode for polarity reversal. The "current-limiting resistor" means that the solar chlorinator uses, during polarity reversal, the current-limiting resistor to limit a value of the current transmitted by the solar panel to the electrode. The "battery" means that the solar chlorinator uses, during polarity reversal, the battery to supply power to the electrode. "Direct" means that the solar chlorinator uses, during polarity reversal, the solar panel to directly supply power to the electrode, the amount of electric energy transmitted by the solar panel to the electrode is not limited, and the battery is not used to supply power to the electrode.

The foregoing descriptions are preferred implementations of the present invention. It should be noted that those of ordinary skill in the art can make various improvements and modifications without departing from the technical principles of the present invention, which shall fall within the protective scope of the present invention.

What is claimed is:

1. A polarity reversal method for an electrode device based on an unstable power supply, wherein the electrode device based on the unstable power supply comprises electrodes, an unstable power supply, a polarity reversal module, and a control module, wherein the unstable power supply supplies power to the electrodes through the polarity reversal module, and the control module controls the polarity reversal module to implement polarity reversal on the electrodes; wherein the polarity reversal method comprises:

wherein at least in a stage of operation in which a reverse voltage is eliminated for the electrodes when polarity reversal is performed on the electrode device based on the unstable power supply, limiting the amount of electric energy transmitted by the unstable power supply to the electrodes, or controlling a stable power supply to be connected to supply power to the electrodes, to ensure electric energy required for operation of the control module in the electrode device based on the unstable power supply.

2. The polarity reversal method for the electrode device based on the unstable power supply according to claim 1, wherein at least in the stage of operation in which a reverse voltage is eliminated for the electrodes when polarity reversal is performed on the electrode device based on the unstable power supply, the amount of electric energy transmitted by the unstable power supply to the electrodes is limited, or the stable power supply is controlled to be connected to supply power to the electrodes, to ensure electric energy required for operation of the control module and the polarity reversal module in the electrode device based on the unstable power supply; and if the stage of operation in which the reverse voltage is eliminated for the electrodes when polarity reversal is performed on the electrode device based on the unstable power supply is completed, or if polarity reversal on the electrode device based on the unstable power supply is completed, stopping limiting the amount of electric energy transmitted by the unstable power supply to the electrodes, or removing the stable power supply to stop power supply to the electrodes.

3. The polarity reversal method for the electrode device based on the unstable power supply according to claim 1, wherein the polarity reversal module is an H-bridge circuit, and the control module controls states of a first bridge arm and a second bridge arm in the H-bridge circuit to implement polarity reversal on the electrodes;

wherein when the first bridge arm is turned on from turned off and the second bridge arm is turned off from turned on, a first electrode of the electrodes is changed from a cathode to an anode; and a second electrode of the electrodes is changed from an anode to a cathode;

wherein when the second bridge arm is turned on from turned off and the first bridge arm is turned off from turned on, the second electrode of the electrodes is changed from the cathode to the anode; and the first electrode of the electrodes is changed from the anode to the cathode;

wherein the control module drives, through a first PWM signal, the first bridge arm to be turned on, and drives, through a second PWM signal, the second bridge arm to be turned on; the control module limits a value of a voltage transmitted by the unstable power supply to the electrodes by controlling a duty cycle of the first PWM signal and a duty cycle of the second PWM signal;

wherein at least in the stage of operation in which the reverse voltage is eliminated for the electrodes when polarity reversal is performed on the electrode device based on the unstable power supply, if the first PWM signal drives the first bridge arm to be turned on, the duty cycle of the first PWM signal is greater than 0% and less than 100%; and if the second PWM signal drives the second bridge arm to be turned on, the duty cycle of the second PWM signal is greater than 0% and less than 100%;

wherein if the stage of operation in which the reverse voltage is eliminated for the electrodes when polarity reversal is performed on the electrode device based on the unstable power supply is completed, or if polarity reversal on the electrode device based on the unstable power supply is completed, in a case that the first PWM signal drives the first bridge arm to be turned on, the duty cycle of the first PWM signal is controlled to be 0% if the first bridge arm is turned on through a low level; or the duty cycle of the first PWM signal is controlled to be 100% if the first bridge arm is turned on through a high level, to stop limiting the value of the voltage transmitted by the unstable power supply to the electrodes; and in a case that the second PWM signal drives the second bridge arm to be turned on, the duty cycle of the second PWM signal is controlled to be 0% if the second bridge arm is turned on through a low level, or the duty cycle of the second PWM signal is controlled to be 100% if the second bridge arm is turned on through a high level, to stop limiting the value of the voltage transmitted by the unstable power supply to the electrodes.

4. The polarity reversal method for the electrode device based on the unstable power supply according to claim 3, wherein the first bridge arm comprises a first controllable switch and a fourth controllable switch, and the second bridge arm comprises a second controllable switch and a third controllable switch;

two ends of the first controllable switch are respectively connected to the first electrode of the electrodes and a positive electrode of the unstable power supply, and a control end is connected to the control module; two ends of the second controllable switch are respectively connected to the first electrode of the electrodes and the ground, and a control end is connected to the control module; two ends of the third controllable switch are respectively connected to the second electrode of the electrodes and the positive electrode of the unstable power supply, and a control end is connected to the control module; two ends of the fourth controllable switch are respectively connected to the second electrode of the electrodes and the ground, and a control end is connected to the control module; and the control module drives and controls the first controllable switch and the fourth controllable switch through the first PWM signal, and the control module drives and controls the second controllable switch and the third controllable switch through the second PWM signal.

5. The polarity reversal method for the electrode device based on the unstable power supply according to claim 1, wherein the electrode device based on the unstable power supply comprises a current-limiting resistor and a current-limiting resistor control unit configured to control whether the current-limiting resistor is connected between the unstable power supply and the electrodes;

wherein at least in the stage of operation in which the reverse voltage is eliminated for the electrodes when polarity reversal is performed on the electrode device based on the unstable power supply, the current-limiting resistor control unit connects the current-limiting resistor between the unstable power supply and the electrodes to limit a value of a current transmitted by the unstable power supply to the electrodes; or if the stage of operation in which the reverse voltage is eliminated for the electrodes when polarity reversal is performed on the electrode device based on the unstable power supply is completed, or if polarity reversal on the electrode device based on the unstable power supply is completed, the current-limiting resistor control unit removes the current-limiting resistor from a position between the unstable power supply and the electrodes, to stop limiting the value of the current transmitted by the unstable power supply to the electrodes.

6. The polarity reversal method for the electrode device based on the unstable power supply according to claim 5, wherein the current-limiting resistor control unit comprises a fifth controllable switch, the current-limiting resistor is disposed between the unstable power supply and the electrodes, and two ends of the fifth controllable switch are respectively connected to two ends of the current-limiting resistor, and a control end is connected to the control module, and wherein the control module controls the fifth controllable switch to be turned off, to connect the current-limiting resistor between the unstable power supply and the electrodes; or the control module controls the fifth switch to be turned on, to remove the current-limiting resistor from the position between the unstable power supply and the electrodes.

7. The polarity reversal method for the electrode device based on the unstable power supply according to claim 1, wherein the electrode device based on the unstable power supply comprises the stable power supply and a stable power supply control unit configured to control whether the stable power supply is connected to supply power to the electrodes;

at least in the stage of operation in which the reverse voltage is eliminated for the electrodes when polarity reversal is performed on the electrode device based on the unstable power supply, the stable power supply control unit connects the stable power supply to supply power to the electrodes; and if the stage of operation in which the reverse voltage is eliminated for the electrodes when polarity reversal is performed on the electrode device based on the unstable power supply is completed, or if polarity reversal on the electrode device based on the unstable power supply is completed, the stable power supply control unit removes the stable power supply to stop power supply to the electrodes.

8. The polarity reversal method for the electrode device based on the unstable power supply according to claim 7, wherein the stable power supply control unit comprises a sixth controllable switch, a positive electrode of the stable power supply is connected to the electrode through the polarity reversal module, a negative electrode is grounded through a switch end of the sixth controllable switch, a control end of the sixth controllable switch is connected to the control module, and wherein the control module controls the sixth controllable switch to be turned on, to connect the stable power supply to supply power to the electrode; and the control module controls the fifth switch to be turned off, to remove the stable power supply to stop power supply to the electrodes.

9. The polarity reversal method for the electrode device based on the unstable power supply according to claim 2, wherein when polarity reversal is performed on the electrode device based on the unstable power supply, if voltages at two ends of the electrode are greater than a minimum working voltage value of the electrode, polarity reversal on the electrode device based on the unstable power supply is completed; and wherein when polarity reversal is performed on the electrode device based on the unstable power supply, if polarity reversal time is greater than time for which the reverse voltage is eliminated for the electrodes, the stage of operation in which the reverse voltage is eliminated for the electrodes when polarity reversal is performed on the electrode device based on the unstable power supply is completed.

10. The polarity reversal method for the electrode device based on the unstable power supply according to claim 1, wherein the unstable power supply is a solar panel, and the stable power supply is a battery;

wherein the control module is connected to the unstable power supply to obtain a value of a voltage of the unstable power supply;

wherein before polarity reversal is performed on the electrode device based on the unstable power supply, if the value of the voltage of the unstable power supply is greater than a preset value for polarity reversal, during polarity reversal, polarity reversal is directly completed without limiting the amount of electric energy transmitted by the unstable power supply to the electrodes and controlling the stable power supply to be connected to supply power to the electrodes; or if the value of the voltage of the unstable power supply is less than a preset value for polarity reversal, during polarity reversal, the amount of electric energy transmitted by the unstable power supply to the electrodes is limited, or the stable power supply is controlled to be connected to supply power to the electrodes, so that polarity reversal is completed;

wherein the electrode device based on the unstable power supply comprises a test resistor and a test resistor control unit configured to control whether the unstable power supply supplies power to the test resistor; and wherein before polarity reversal is performed on the electrode device based on the unstable power supply, the test resistor control unit controls the unstable power supply to supply power to the test resistor, to obtain a true value of the voltage of the unstable power supply.

* * * * *